US012695240B2

(12) United States Patent
De Bruijn et al.

(10) Patent No.: US 12,695,240 B2
(45) Date of Patent: Jul. 28, 2026

(54) DISTRIBUTION AUTOMATION DEVICE

(71) Applicants: TE Connectivity Nederland BV, 's-Hertogenbosch (NL); TE Connectivity Germany GmbH, Bensheim (DE)

(72) Inventors: Jeroen Jozef Maria De Bruijn, 's-Hertogenbosch (NL); Guenter Feldmeier, Bensheim (DE)

(73) Assignees: TE Connectivity Germany GmbH, Bensheim (DE); TE Connectivity Nederland B.V., s'Hertogenbosch (NL)

( * ) Notice: Subject to any disclaimer, the term of this patent is extended or adjusted under 35 U.S.C. 154(b) by 570 days.

(21) Appl. No.: 17/741,974

(22) Filed: May 11, 2022

(65) Prior Publication Data

US 2022/0271472 A1     Aug. 25, 2022

Related U.S. Application Data

(63) Continuation of application No. PCT/EP2020/081617, filed on Nov. 10, 2020.

(30) Foreign Application Priority Data

Nov. 12, 2019   (EP) .................................... 19208721

(51) Int. Cl.
    *H01R 13/518*       (2006.01)
    *H01R 13/52*        (2006.01)
             (Continued)

(52) U.S. Cl.
    CPC ......... *H01R 13/622* (2013.01); *H01R 13/518* (2013.01); *H01R 13/625* (2013.01);
             (Continued)

(58) Field of Classification Search
CPC .. H01R 13/622; H01R 13/518; H01R 13/625; H01R 13/6272; H01R 13/5202; H01R 13/5219; H01R 13/6456; H01R 27/02
See application file for complete search history.

(56) References Cited

U.S. PATENT DOCUMENTS 6,146,174 A * 11/2000 Maeda ............... H01R 13/5219
                                                439/271
6,704,815 B1    3/2004 Morikawa et al.
             (Continued)

FOREIGN PATENT DOCUMENTS

CN        1283824 A1    2/2001
CN      103618165 A    3/2014
             (Continued)

OTHER PUBLICATIONS

DE 102015015202 with machine translation.*
             (Continued)

*Primary Examiner* — Renee S Luebke
*Assistant Examiner* — Paul D Baillargeon
(74) *Attorney, Agent, or Firm* — Barley Snyder

(57)          ABSTRACT

A distribution automation device for receiving a plug connector includes a housing having a socket at least partially receiving the plug connector. The socket has a locking feature engaging a complementary locking feature of the plug connector. The locking feature and the housing are formed integrally with one another as a monolithic unit.

20 Claims, 6 Drawing Sheets

(51) Int. Cl.

| | |
|---|---|
| *H01R 13/622* | (2006.01) |
| *H01R 13/625* | (2006.01) |
| *H01R 13/627* | (2006.01) |
| *H01R 13/645* | (2006.01) |
| *H01R 27/02* | (2006.01) |
| *H02G 3/08* | (2006.01) |

(52) U.S. Cl.

CPC ......... *H01R 13/6272* (2013.01); *H01R 27/02* (2013.01); *H01R 13/5202* (2013.01); *H01R 13/5219* (2013.01); *H01R 13/6456* (2013.01); *H02G 3/08* (2013.01)

(56) References Cited

U.S. PATENT DOCUMENTS

| | | | | |
|---|---|---|---|---|
| 8,585,437 | B2 | 11/2013 | Lin | |
| 10,680,381 | B2 * | 6/2020 | Hagmann | ............ H01R 13/748 |
| 2009/0176405 | A1 | 7/2009 | Kleinkorres | |
| 2011/0143572 | A1 | 6/2011 | Friedrich | |
| 2013/0081848 | A1 | 4/2013 | Wu et al. | |
| 2014/0179137 | A1 | 6/2014 | Wang | |
| 2018/0062299 | A1 | 3/2018 | Nishide | |
| 2018/0241154 | A1 | 8/2018 | Khorrami et al. | |

FOREIGN PATENT DOCUMENTS

| | | | |
|---|---|---|---|
| CN | 206962129 | U | 2/2018 |
| CN | 108511984 | A | 9/2018 |
| DE | 102006051280 | A1 | 4/2008 |
| DE | 102013002852 | A1 | 8/2014 |
| DE | 102015015202 | A1 | 5/2017 |
| EP | 2575222 | A2 | 7/2012 |
| EP | 2575222 | A3 | 7/2012 |

OTHER PUBLICATIONS

Examination Report from the European Patent Office dated Mar. 15, 2023, corresponding to Application No. 19 208 721.1-1201, 8 pages.

Chinese First Office Action dated Oct. 20, 2023 with English translation, corresponding to Application No. 202080078155.0, 18 pages.

PCT Search Report, Application No. PCT/EP2020/081617, Dated: Feb. 4, 2021, 13 pages.

Extended European Search Report, Application No. 19208721.1-1201, Dated: Apr. 29, 2020, 8 pages.

European Patent Office Communication dated Nov. 20, 2024, corresponding to Application No. 19 208 721.1-1201, 7 pages.

Molex, Ultra-Lock Connection System, 20 pages, https://www.molex.com.

Harting, PushPull, 15 pages, harting.com/en-HU/s/splp-harting-pushpull.

* cited by examiner

DISTRIBUTION AUTOMATION DEVICE

CROSS-REFERENCE TO RELATED APPLICATIONS

This application is a continuation of PCT International Application No. PCT/EP2020/081617, filed on Nov. 10, 2020, which claims priority under 35 U.S.C. § 119 to European Patent Application No. 19208721.1, filed on Nov. 12, 2019.

FIELD OF THE INVENTION

The invention relates to a distribution automation device for receiving a plug connector.

BACKGROUND

A distribution automation device, such as a sensor-actuator box or junction box, is often used in decentralized connection technology as a connection between the periphery and the control unit. The distribution automation device may be an industrial internet of things (HOT) gateway for transferring data over a network without requiring human-to-human or human-to-computer interaction. The distribution automation device may collect sensor signals and/or distribute actuator signals. The sensors and/or actuators can be connected to the distribution automation device with plug connectors. The plug connector is inserted into a socket of the housing of the distribution automation device and can be mated with and locked to a socket insert mounted to the housing. However, any force acted upon the plug connector is directly transmitted to the socket insert, possibly damaging the electrical connection between the plug connector and the socket insert.

SUMMARY

A distribution automation device for receiving a plug connector includes a housing having a socket at least partially receiving the plug connector. The socket has a locking feature engaging a complementary locking feature of the plug connector. The locking feature and the housing are formed integrally with one another as a monolithic unit.

BRIEF DESCRIPTION OF THE DRAWINGS

The invention will now be described by way of example with reference to the accompanying Figures, of which.

DETAILED DESCRIPTION OF THE EMBODIMENT(S)

Figures 1A, 1B:
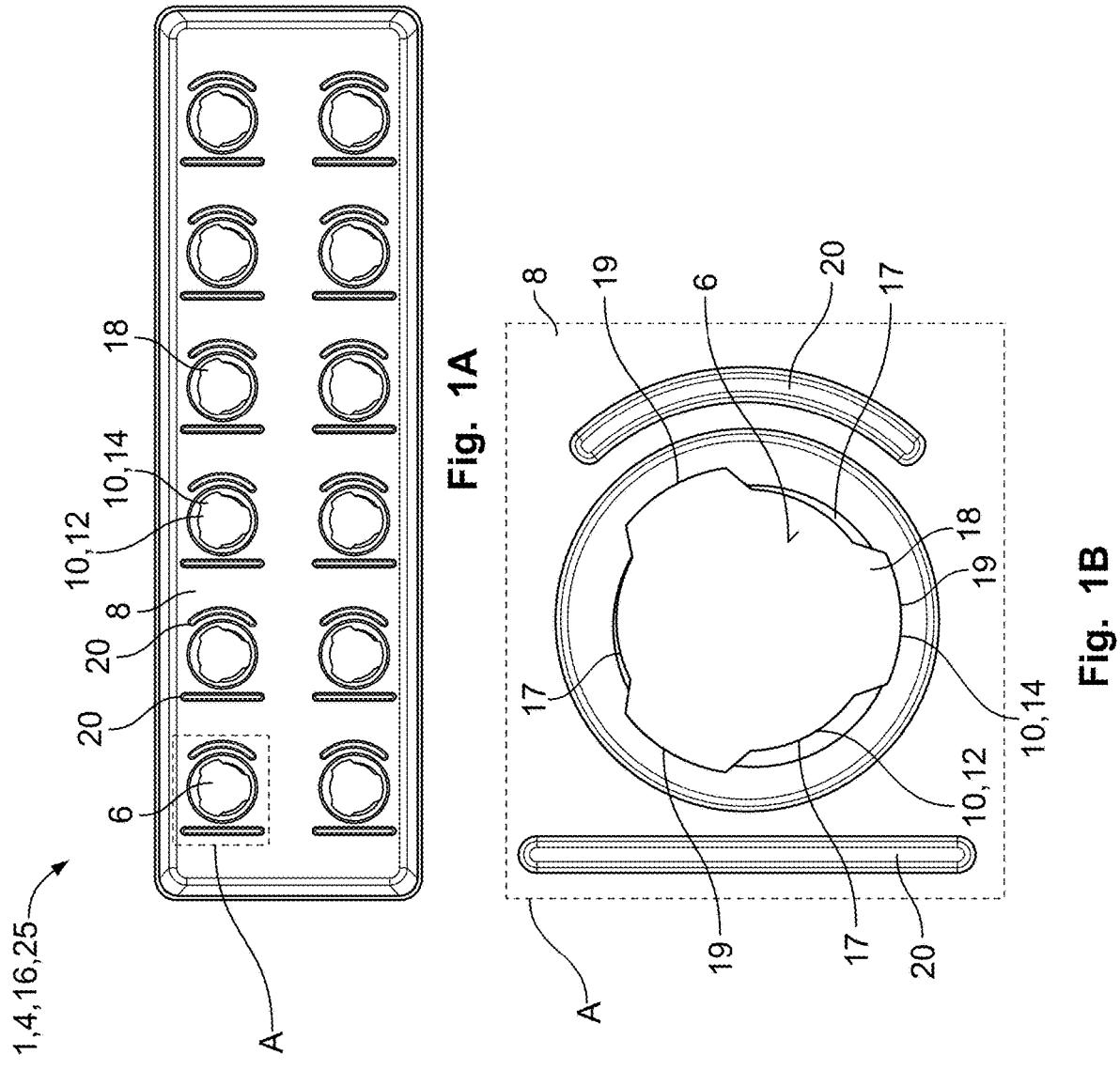
FIG. 1A is a schematic bottom view of a distribution automation device according to the invention.
FIG. 1B is an enlarged view of portion A from FIG. 1A.

In the following, the distribution automation device according to the invention is explained in greater detail with reference to the accompanying drawings, in which exemplary embodiments are shown. In the figures, the same reference numerals are used for elements that correspond to one another in terms of their function and/or structure. According to the description of the various aspects and embodiments, elements shown in the drawings can be omitted if the technical effects of those elements are not needed for a particular application, and vice versa: i.e. elements that are not shown or described with reference to the figures but are otherwise described herein can be added if the technical effect of those particular elements is advantageous in a specific application.

A first exemplary embodiment of a distribution automation device 1 and a connector arrangement 2 is described with reference to FIGS. 1A, 1B, and 2. In various embodiments, the distribution automation device 1 is a junction box or a sensor-actuator box.

FIG. 1A shows a schematic bottom view of the distribution automation device 1 and FIG. 1B shows an enlarged view of A from FIG. 1A. The distribution automation device 1 comprises a housing 4 with at least one socket 6 for receiving at least two types of plug connectors penetrating a front face 8 of the housing 4. A first type of the plug connector and a second type of the plug connector may be different from one another in at least one of size and kind, e.g. the first type of the plug connector and the second type of the plug connector may comprise different complementary locking features. The socket 6 comprises at least two locking features 10, whereby a first locking feature 12 is adapted to lockingly engage the first type of the plug connector, and the second locking feature 14 is adapted to lockingly engage the second type of the plug connector.

The at least one socket 6 of the distribution automation device 1 is adapted to receive at least two different types of plug connectors, allowing the user to integrate the different types of plug connectors, particularly standardized plug connectors, in a single distribution automation device 1. Hence, there is no need to provide a different distribution automation device for each type of plug connector, as the at least two types of plug connectors may be received in the distribution automation device 1.

In order to further facilitate the manufacturing process of the distribution automation device 1, the at least two locking features 10 are formed integrally with one another and the housing 4 as a monolithic unit 16. No further parts have to be mounted in order to secure the plug connector in the distribution automation device 1, reducing the overall size of each socket 6. Therefore, the packing density may be increased, or the housing 4 may be adapted for plug connectors having a larger diameter while maintaining the same outer contour compared to housings 4 for plug connectors having a smaller diameter.

The at least two locking features 10 may be arranged essentially coaxial to the socket 6, allowing a simultaneous insertion of the plug connector and locking of the plug connector in the socket 6. As can be seen in FIG. 1A, the housing 4 may comprise multiple sockets 6 arranged in two rows on the front face 8. Each socket 6 may be essentially circumferential having radial notches 18 partially extending along the circumference. In other words, the socket 6 is radially bordered by the housing 4, particularly the at least two locking features 10, whereby at the notches 18 the radial distance to the border is larger than at the parts adjacent to the notches 18.

The at least two locking features 10 may extend along the radial border. In an embodiment, the first locking feature 12 may extend over a part 17 of the inner circumference of the socket, and the second locking feature 14 may extend over a different part 19 of the inner circumference of the socket 6, as shown in FIGS. 1A and 1B. In this exemplary embodiment, the second locking feature 14 may be formed in the notches, and the first locking feature 12 may be formed in the parts between the notches 18. Consequently, the second type of the plug connector may have a larger outer contour complementary to the notches 18.

The parts 17, 19 may be arranged alternatingly along the circumference. In order to equally arrange the at least two locking features 10 around the circumference and balance the plug connector within the socket 6, the at least two locking features 10 may each extend over three respective parts 17, 19, whereby the parts with the same locking feature 10 may be arranged at approximately 120° to one another. Each part 17, 19 may extend over approximately 30° around the inner circumference of the socket 6 thus forming a rotationally symmetrical cross section of the socket 6 in a plane essentially perpendicular to an axial direction of the socket 6. Hence, the plug connector may be inserted in at least three possible rotational positions into the socket 6. Consequently, the locking force acting upon the respective plug connector may be evenly distributed along the circumference of the plug connector and the socket 6. In an alternating arrangement of the first and second locking features, a part with the first locking feature may be arranged diametrically to a part with the second locking feature. Of course, any other combination of number of parts and lengths of each part is imaginable within the scope of the application, such as having four alternating parts each extending around approximately 90° of the circumference.

A socket insert 24 may be mounted in the housing 4. In order to facilitate the positioning of the socket insert within the housing 4, the housing 4 may further comprise at least one positioning rib 20 protruding from a bottom surface 22 of the front face 8 of the housing 4. The at least one positioning rib 20 may be adapted to the shape of the socket insert 24. In an embodiment, two positioning ribs 20 may be provided at opposite sides radially to the socket, the two positioning ribs 20 being not symmetrical, particularly rotationally symmetrical, around a center axis of the socket 6. Consequently, the two positioning ribs 20 may act as polarizing features, allowing the socket insert 24 to only be mounted in a predetermined rotational position.

The monolithic unit 16 may be an injection molded piece, formed of a plastic material, allowing a cost-efficient production of the monolithic unit 16, especially in large numbers. However, to further increase the rigidity of the monolithic unit 16, the monolithic unit 16 may be a die cast part 25 and may comprise aluminum or an aluminum alloy; the forces acting upon the inserted plug connector, such as pulling forces or vibrations, may be transferred to the housing 4 as the plug connector is directly engaged with the housing 4, rather than to the socket insert, reducing the strain in the electrically coupled components during the application. Particularly, the thread being tapped into the die cast part 25 may increase the retention forces of the at least one locking feature 10, reducing the risk of unintentionally pulling the plug connector out of the housing and damaging the housing and/or the plug connector. Furthermore, the amount of separate parts in the distribution automation device 1 can be reduced, further facilitating the manufacturing and assembly of the distribution automation device 1.

Figure 2:
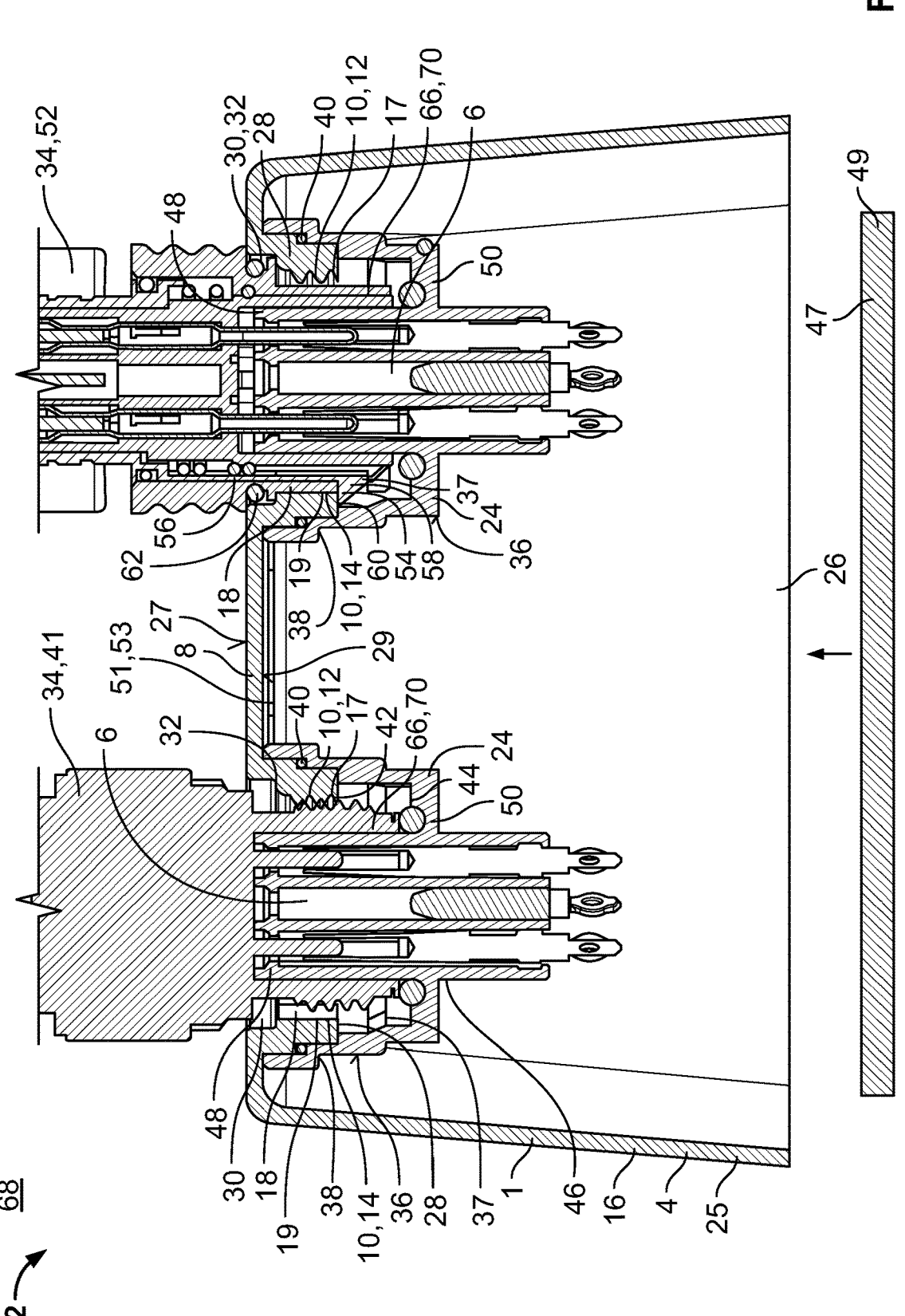
FIG. 2 is a schematic sectional view of a first embodiment of the distribution automation device.

FIG. 2 shows a schematic cut view of the exemplary embodiment of the connector arrangement 2. The connector arrangement 2 comprises the distribution automation device 1 and at least one socket insert 24 mounted to the housing 4. For each socket 6, a socket insert 24 may be provided, the socket insert 24 being arranged coaxially to the respective socket 6.

As can be seen in FIG. 2, the housing 4 may at least partially enclose a volume 26. The socket insert 24 may be received in the volume 26 and may not protrude from the socket 6 on a side 27 of the front face 8 facing away from the volume, in order to keep the height of the connector arrangement 2 relatively low, allowing an application even with tight space restrictions. To further decrease the size of the distribution automation device 1, the at least one socket 6 may comprise an entry opening being essentially flush with a top surface of the front face 8 facing away from the volume. Consequently, no protuberance is formed on the top surface framing the entry opening of the at least one socket 6.

A gap 66 may be formed between the socket insert 24 and the housing 4, the gap 66 providing access to the at least two locking features 10. The gap 66 is open at a side of the socket 6 facing the outside 68 and may form a channel 70 leading to the second locking feature 14.

The at least two locking features 10 may be formed on an essentially hollow cylindrical protrusion 28 protruding from a side 29 of the front face 8 facing the volume 26 further into the volume 26. Consequently, the notches 18 may be formed on the protrusion 28.

In order to keep the distribution automation device 1 compact, the protrusion 28 may extend from the front face 8 towards the volume 26. Therefore, the at least one locking feature 10 may be arranged inside the volume 26, reducing the overall dimensions of the distribution automation device 1. The insertion depth of the plug connector into the housing 4 may be increased. Therefore, the distribution automation device 1 is also suitable for applications having restricted space.

The socket 6 radially limited by the protrusion 28 may flow into a depression 30 formed on the side 27 on the front face 8. The socket 6 may have a larger light width, particularly larger light diameter at the depression 30 compared to the light width, particularly light diameter, of the socket at the protrusion 28. Therefore, an abutment shoulder 32 is formed which may be adapted to receive a collar of the plug connector 34 limiting the insertion depth of the plug connector 34.

The protrusion 28 may further comprise a stepped outer surface 36, whereby the outer diameter of the protrusion 28 increases in at least one step 38 at an end closer to the front face 8. The protrusion 28 may be fittingly received in the socket insert 24, whereby the socket insert 24 may comprise a sealing ring 40 adapted to be pressed into a corner of the step 38, sealing the connection between the housing 4 and the socket insert 24. The socket insert 24 may be pressed between the front face 8 of the housing 4 and the contact element.

In order to minimize the space occupied by the distribution automation device 1, the at least two locking features 10 and/or the protrusion 28 may not protrude beyond the side 27 of the front face 8 from the side 29 facing the volume 26. The side 27 may be flat.

In FIG. 2, the first type of plug connector 41 is shown on the left-hand side and the second type of plug connector 52 is shown on the right-hand side. As can be seen, the plug connector of the first type 41 may be a metric connector, such as a M12 connector, comprising an external thread as a complementary formed locking feature 37. Therefore, the first locking feature 12 may be an internal thread 42. The internal thread 42 may extend over the parts 17 being closer to the center axis of the socket 6, as explained above with reference to FIGS. 1A and 1B. The thread 42 may be normed such that depending on the market, the thread 42 may be a metric ISO-thread or a thread according to the Unified Thread Standard (UTS). The thread 42 may be tapped into the parts 17. Consequently, a single die structure is necessary for producing distribution automation devices while the thread 42 can later be added according to specific application requirements.

The thread 42 may be tapped, allowing for a productive and economical threading through high cutting speeds and long tool life. The monolithic unit 16 can be formed in a first step and the thread 42 may be tapped afterwards. Consequently, the monolithic unit 16 can be formed in a mass scale having identical dies, and different threads may be tapped depending on the requirements, further optimizing the manufacturing process.

The first type of the plug connector 41 may be threaded into the socket 6 engaging the first locking feature 12, as shown in FIG. 2. The plug connector of the first type 41 may be inserted until abutment of a bottom surface 44 of the socket insert 24. In an embodiment, the socket insert 24 may comprise a second sealing ring at the bottom surface 44 being adapted to seal the connection between the plug connector of the first type 41 and the socket insert 24.

The socket insert 24 may be a connector interface 46 having a central contact pillar 48 extending coaxially into the socket 6. The contact pillar 48 may be adapted to receive contact pins of the plug connector 34 and electrically couple it with a further contact element 47 received in the volume 26, such as a printed circuit board 49. The contact pillar 48 may be provided with at least one through hole in which the contact pin of the plug connector 34 can be inserted from outside the volume 26. On the opposite side, a contact terminal, such as a press fit pin, may be inserted into the through hole such that the terminal electrically contacts the contact pin. The press fit pin may be connected to a printed circuit board 49 on the end protruding from the through hole. Consequently, the plug connector 34 may be connected to the printed circuit board (PCB) 49 via the socket insert 24.

The plug connector may be electrically connected to the contact element 47 via the contact pin. The contact pin may, for example, be a soldering pin or a press-fit pin. Since, according to the invention the plug connector is directly locked to the socket insert 24, the connection between the socket insert 24 and the contact element will not be affected due to stress exerted onto the plug connector, such as pulling forces.

The socket insert 24 and the contact element may be preassembled prior to mounting the socket insert 24 in the housing 4, providing space for the assembly of the socket insert 24 and the contact element. Alternatively, the socket insert 24 may first be attached to the housing 4 before mounting the contact element, particularly the printed circuit board 49. The at least one contact pin may either be attached to the socket insert 24 before mounting the contact element, or be positioned and secured to the contact element and subsequently pushed into the through hole of the socket insert 24.

Since the forces acting upon the plug connector are directly transferred to the housing 4 rather than to the socket insert 24, the socket insert 24 is not affected by said forces. Therefore, no additional locking features are necessary to lock the socket insert 24 to the housing 4. Consequently, the socket insert 24 may be a simple molding construction without undercuts or the like. Therefore, the size of the socket insert 24 may be reduced, particularly the size in the radial direction. Hence, the distance of the socket 6 from a side surface of the housing 4 may be reduced, allowing a larger distance between adjacent sockets 6, increasing the pitch between the respective socket inserts 24.

The socket insert 24 may be attached to the housing 4 by friction. No further tooling is required to facilitate the installation of the socket insert 24 to the housing 4.

The housing 4 may have fixing devices for securing the contact element 47 to the housing 4, for example, by screws. Therefore, the securing of the contact element within the housing 4 may prevent the socket insert 24 from accidentally being pushed further into the volume 26.

With the distribution automation device 1 and connector arrangement 2, different assembly sequences are possible. For example, the socket insert 24 may be mounted on the PCB 49 via the press-fit pins or alternatively may be soldered onto the PCB 49, before inserting the subassembly into the distribution automation device 1. However, the socket insert 24 may also be assembled in the distribution automation device 1 before connecting the socket insert 24 to the PCB 49, as shown in FIG. 2.

A tub 50 may be formed coaxially around the contact pillar 48 comprising the bottom surface 44 and being open towards the front face 8, as shown in FIG. 2. The tub 50 may fittingly receive the at least two locking features 10, so that the at least two locking features 10 may be arranged between an inner circumferential wall of the tub 50 and the contact pillar 48. The locking features of the plug contact may be inserted between the contact pillar 48 and the at least two locking features 10.

In an embodiment, the socket insert 24 may be formed as an injection molded piece, particularly as a multi component mold; i.e. molding of two or more components in at least two molding steps. An electrically insulating body may be formed in the first molding step, and subsequently the at least one sealing ring 40 may be molded to the insulating body. Therefore, the at least one sealing ring 40 may be integrated into the molding design, eliminating an assembly process. The sealing rings 40 may be formed integrally with the tub 50 during the injection molding process.

Multiple socket inserts 24 may be combined into a unitary part 51. The unitary part 51 may hold each socket insert 24 at a predetermined relative position to one another to match an arrangement of sockets 6 formed in the housing 4. Therefore, multiple socket inserts 24 can be mounted in the housing 4 simultaneously, allowing an easy pre-alignment of the socket insert 24 in the distribution automation device 1 and a reduction of assembly time. The unitary part 51 may be a monolithic part 53, e.g. via injection molding. Hence, the pitch between the socket inserts 24 may be fixed during the production process of the monolithic part 53.

The unitary part 51 may comprise sections of reduced material thickness in comparison to its immediate surroundings for forming a predetermined breaking area for separating one socket insert 24 from the unitary part 51.

The unitary part 51 may be formed as a longitudinal strip, wherein at either lateral side at least one socket insert 24 may be attached protruding laterally from the longitudinal strip. Therefore, two rows of socket inserts 24 may be provided, wherein the longitudinal strip is adapted to be arranged between two sockets 6 in the housing 4.

On the right-hand side of FIG. 2, the second type of plug connector 52 is shown. The second type of the plug connector 52 may be a push-pull connector, particularly an inner push-pull connector having at least one elastically deflectable latch 54 as complementary formed locking features 37. The latch 54 may have a spring body 56 extending axially with a radial latching protrusion 58 at a free end of the latch 54 extending radially outward. The latch 54 may be inserted in the notch 18 providing space for deflecting the latch 54, particularly the radial latching protrusion 58, radially inwards. After passing the protrusion 28, the latch 54 regains its initial position so that the radial latching protrusion 58 may abut the second locking feature 14 in a positive fit. The radial latching protrusion 58 may abut a stop surface 60 of the second locking feature 14, preventing a removal of the plug connector 52 of the second type from the socket 6.

The at least one locking feature 14 may be formed as a limit stop which is adapted to be engaged by the latch 54 in a positive fit. Hence, the at least one locking feature 14 prevents accidental disconnection, and is adapted to form a simple but fast and strong locking mechanism together with the complementary locking feature 37 of the plug connector 52. Therefore, the at least one locking feature 37 may act as a radial limit of the socket 6.

For removing the second type of plug connector 52 from the socket 6, the second type of plug connector 52 may be actuated, for example, by pressing or pushing a part of the connector, causing the latch 54 to be deflected radially inwards and disengaging the second locking feature 14.

Contrary to the first type of plug connector 41, the second type of plug connector 52 does not abut the sealing ring 40 formed on the bottom of the socket insert 24. Instead, the second type of plug connector 52 comprises a sealing ring 62 adapted to be received in the depression 30 for sealing the connection between the second type of plug connector 52 and the socket 6.

Figure 3:
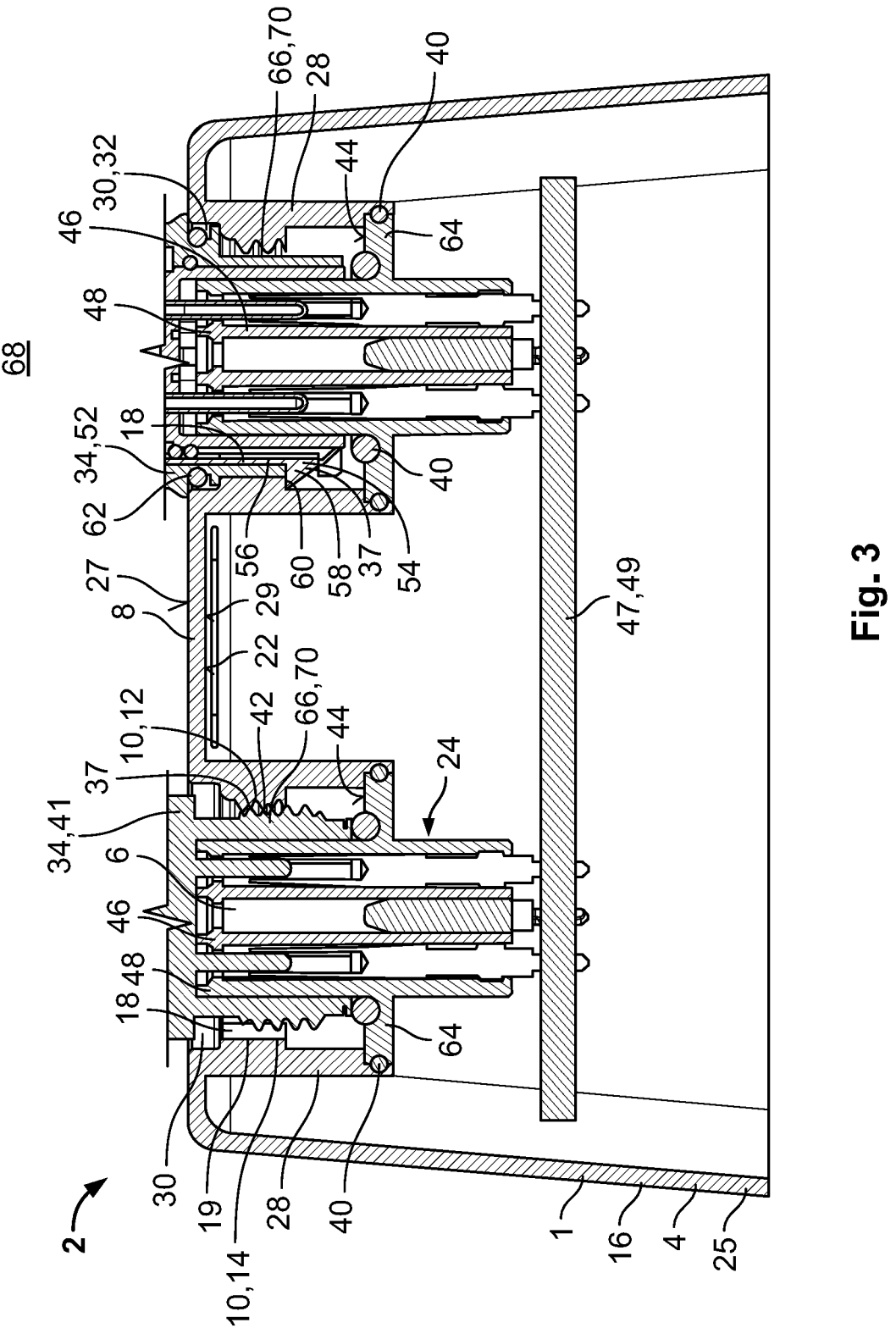
FIG. 3 is a schematic sectional view of a second embodiment of the distribution automation device.

In FIG. 3, a second exemplary embodiment of the inventive distribution automation device 1 and connector arrangement 2 is shown. Contrary to a first embodiment, the socket insert 24 does not fittingly receive the at least two locking features 10. The socket insert 24 comprises a radially protruding essentially disc-shaped collar 64 having a sealing ring 40 on a surface facing the socket 6 adapted to sealingly engage at least one of the at least two locking features 10. Furthermore, the socket insert 24 comprises a second sealing ring 40 extending around the outer circumference of the collar 64.

The protrusion 28 of the distribution automation device 1 may extend further into the volume 26 than the at least two locking features 10 forming a receptacle for fittingly receiving the collar 64 of the socket insert 24. Thus, the second sealing ring 40 is pressed between the collar 64 of the socket insert 24 and the protrusion 28 sealing the connection between the socket insert 24 and the distribution automation device 1. Alternatively, a single sealing ring 40 may be provided covering the surface of the collar 64 facing the socket 6 (see FIG. 4). The single sealing ring 40 may be adapted to seal both the connection between the at least one socket insert 24 and the housing 4 and the connection between the at least one socket insert 24 and at least one type of the plug connector 342. The socket insert 24 does not radially protrude from the socket 6, allowing the distance of the socket 6 and the side surface of the housing 4 to be minimized.

As the socket insert 24 is not put over the protrusion 28, it is possible to position each socket 6 closer to an edge of the front face 8, particularly a side edge of the front face 8, increasing the distance between two adjacent sockets 6. Hence, the pitch between the plug connectors 34 may be prevented.

It should be noted that the embodiments shown in the figures relate to an exemplary embodiment of the inventive distribution automation device 1. However, according to the invention, the at least one socket 6 may also comprise just one type of locking feature 10 for engaging a complementary locking feature 37 of the at least one plug connector 34. The at least one plug connector 34 may be an inner push-pull type plug connector and the locking feature 10 may be adapted to engage the locking latch of the plug connector 34.

Now a further advantageous exemplary embodiment of a socket insert 24 is discussed with reference to FIGS. 5 and 6. In contrast to the socket inserts 24 shown in FIGS. 2 to 4, this socket insert 24 is adapted to be secured to the socket 6 by a securing feature 72 which, in this exemplary embodiment, is formed as an external thread 74. The securing feature 72 may be locked to the protrusion 28 of the socket 6 via a bayonet lock assembly, for example. Hence, any force acting on the socket insert 24 is directly compensated by the locking engagement of the securing feature 72 and the socket 6, so that the force is not further transmitted to the contact element 47. The securing feature 72 may be adapted to engage and may be complementary to one of the first or second type of locking feature 12, 14 in a positive fitting and/or force fitting manner. In this case, the external thread 74 may be adapted to engage the internal thread 42.

Should the relative rotational position of the socket insert 24, particularly of the contact pillar 48, within the socket 6 be predetermined, the securing feature 72 may be formed on a securing flange 76, which is movable in a rotational direction R relative to the remainder of the socket insert 24. Hence, a rotational movement of the securing flange 76 does not affect the rotational position of the remainder of the socket insert 24.

Figure 6:
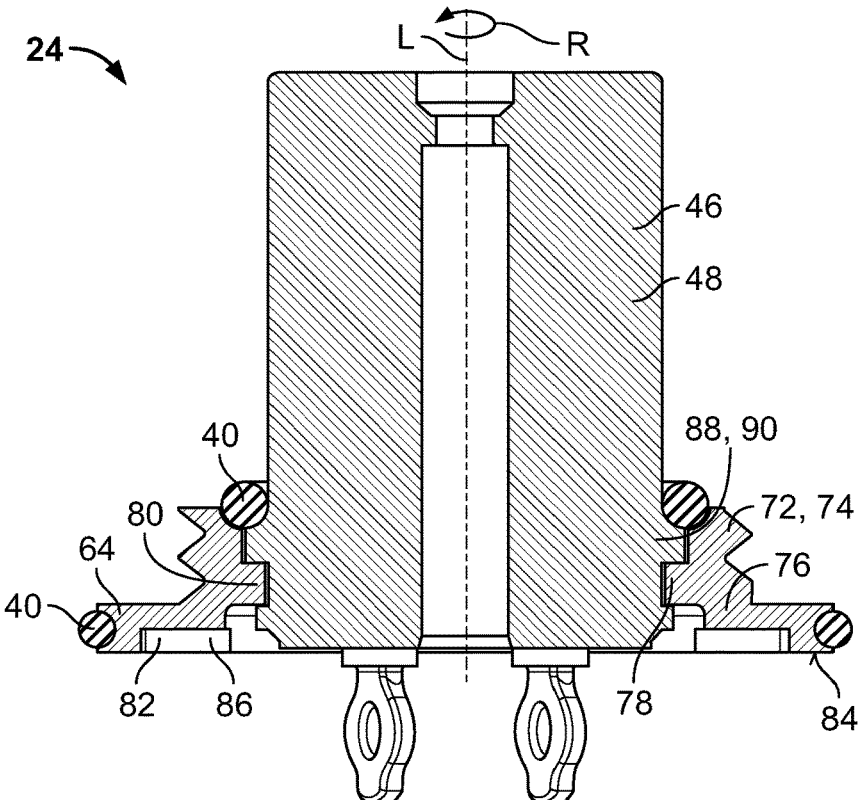
FIG. 6 is a schematic sectional view of the socket insert of FIG. 5.

As can be seen in FIG. 6, the securing flange 76 may be essentially ring shaped and be sleeved around the contact pillar 48. For this, the securing flange 76 may comprise a radially inward protruding projection 78, which is received in a radial recess 80 extending along a closed circumference of the contact pillar 48, thus, forming a tongue-groove joint. A free rotational movement of the securing flange 76 is possible, while a movement of the securing flange 76 relative to the contact pillar 48 along a longitudinal axis L of the contact pillar 48 may be prevented when the projection 78 is fittingly received in the recess 80.

The relative rotational position of the socket insert 24 to the socket 6 may be determined upon mounting the socket insert 24 within the socket 6, for example with a tool. For this, the provision of the securing feature 72 on the securing flange 76 may be of particular advantage as the rotational movement of the securing flange 76 for locking the socket insert 24 to the housing 4 does not influence the relative rotational position of the remainder of the socket insert 24, particularly the contact pillar 48.

The securing flange 76 may be provided with the collar 64, as shown in FIG. 6, so that the securing flange 76 comprises both the securing feature 72 for securing the socket insert 24 to the socket 6 and the radially protruding collar 64 adapted to be fittingly received in the socket 6.

Figure 5:
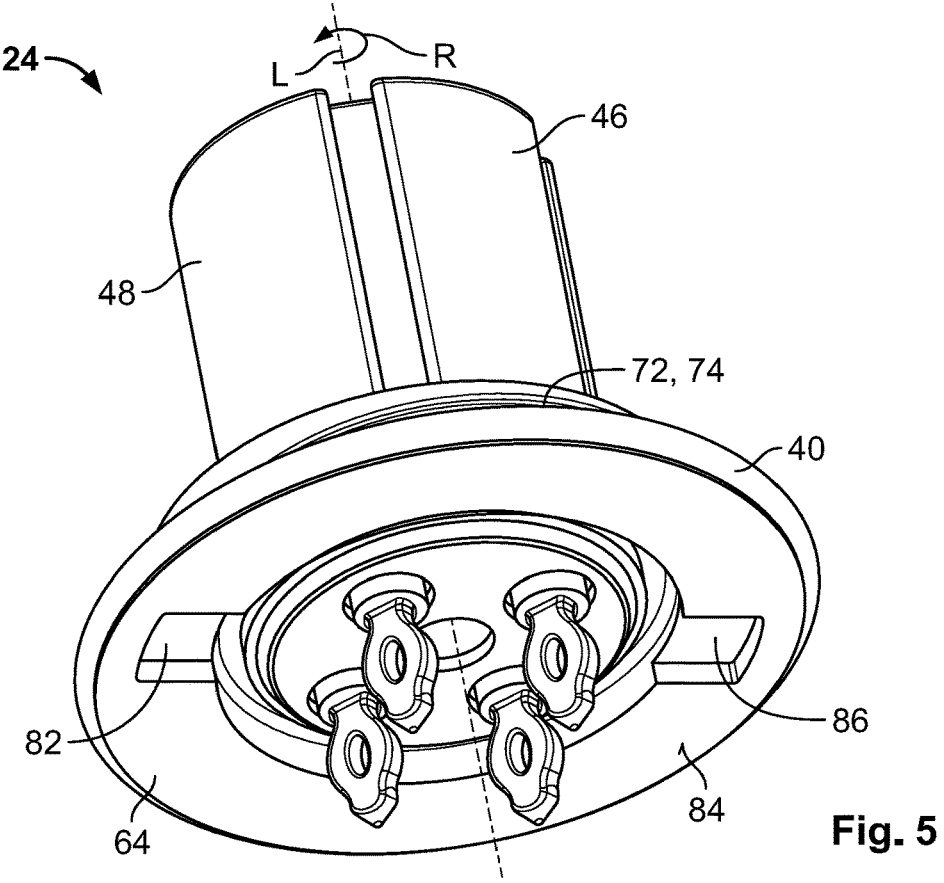
FIG. 5 is a schematic perspective view of an exemplary embodiment of a socket insert.

In order to actuate the rotational movement of the securing flange 76 relative to the remainder of the socket 6, the securing flange 76 may comprise at least one engagement portion 82, shown in FIGS. 5 and 6. The engagement portion 82 may facilitate the engagement and/or disengagement between securing flange 76 and may be adapted to be engaged via a hand or a tool. The engagement portion 82 may for example be formed as a gripping surface having an increased roughness, so that the friction between the finger and the securing flange 76 is higher, preventing the finger from slipping when turning the securing flange 76. Alternatively, the engagement portion 82 may be formed as a knob protruding from the securing flange 76.

The engagement portion 82 is formed on a flat face 84 of the securing flange 76, the flat face 84 facing away from the socket 6 or front face 8 of the housing 4. Therefore, the engagement portion 82 may be easily accessed during assembly, while the access is restricted in a fully assembled state of the distribution automation device 1, preventing accidental untightening of the socket insert 24 from the socket 6. The engagement portion 82 may be adapted for engagement with a tool and may thus be provided with an internal or external screw drive. Any type of screw drive may be envisioned, such as a hex drive for a standardized, or even a specific, hex key.

In this exemplary embodiment shown in FIGS. 5 and 6, the engagement portion 82 may be formed as a recessed area 86 on the flat face 84 of the securing flange 76. Two engagement portions 82 may be arranged on diametrically opposite sides on the flat face 84, which may be engaged with a fork shaped tool. Such an arrangement allows for a symmetric or even uniform application of force for rotating the securing flange 76 and therefore prevents tilting of the securing flange 76.

Figure 4:
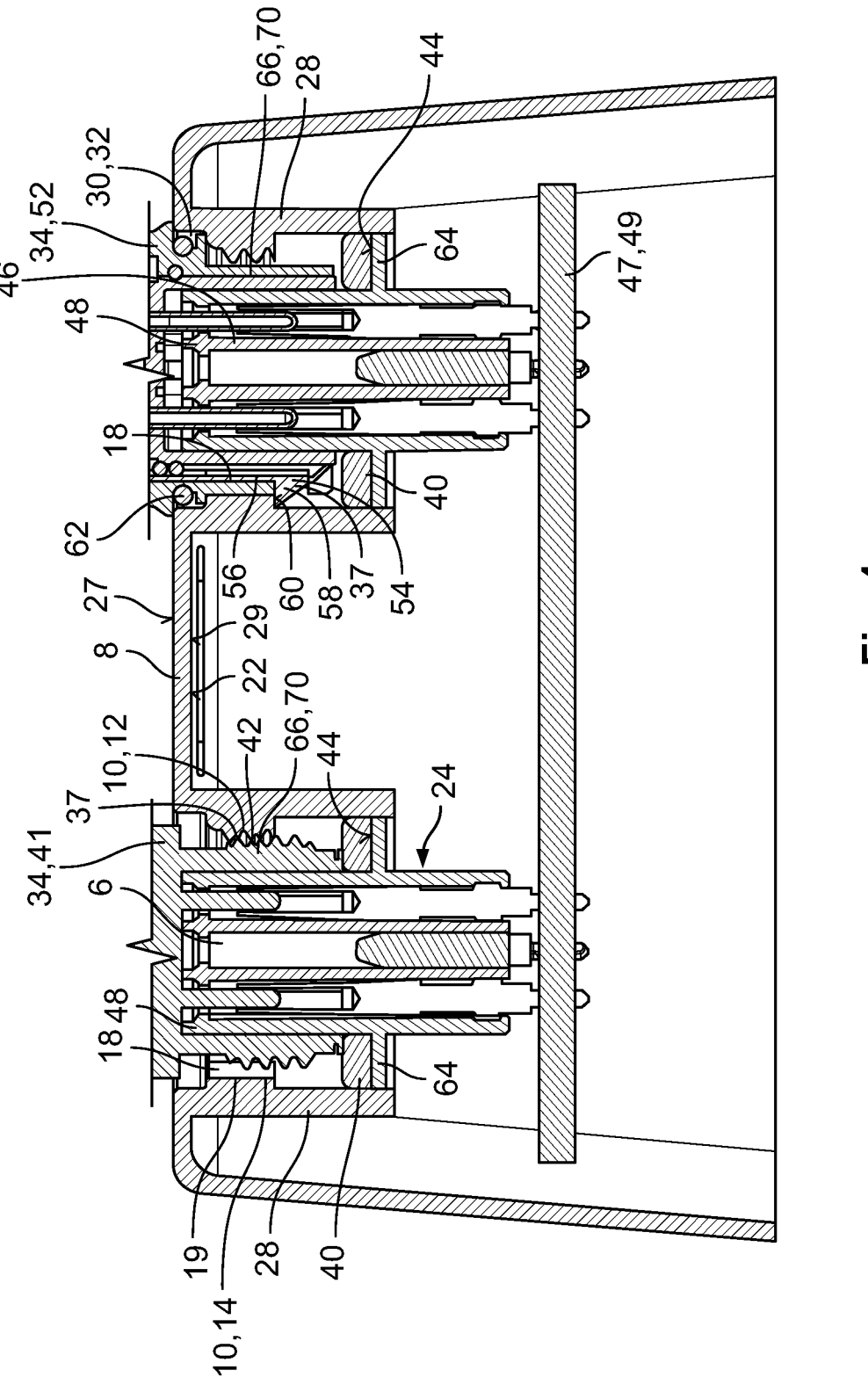
FIG. 4 is a schematic sectional view of a third embodiment of the distribution automation device.

In contrast to the socket inserts 24 shown in FIGS. 3 and 4, the collar 64 does not form the bottom surface 44. Instead, the contact pillar 48 comprises a radially protruding ring-shaped abutment shoulder 88 having a sealing ring 40 formed on the bottom surface 44. The abutment shoulder 88 may simultaneously form a rim 90 of the recess 80.

The relative rotational position of the contact pillar 48 may be determined upon insertion into the socket 6, as the locking of the socket insert 24 to the socket 6 does not affect the rotational position of the contact pillar 48. The relative rotational position of the contact pillar 48 may be set by an extra tool during assembly. This allows the assembly of the socket insert 24 without having to increase the dimensions of the distribution automation device 1.

Figure 7:
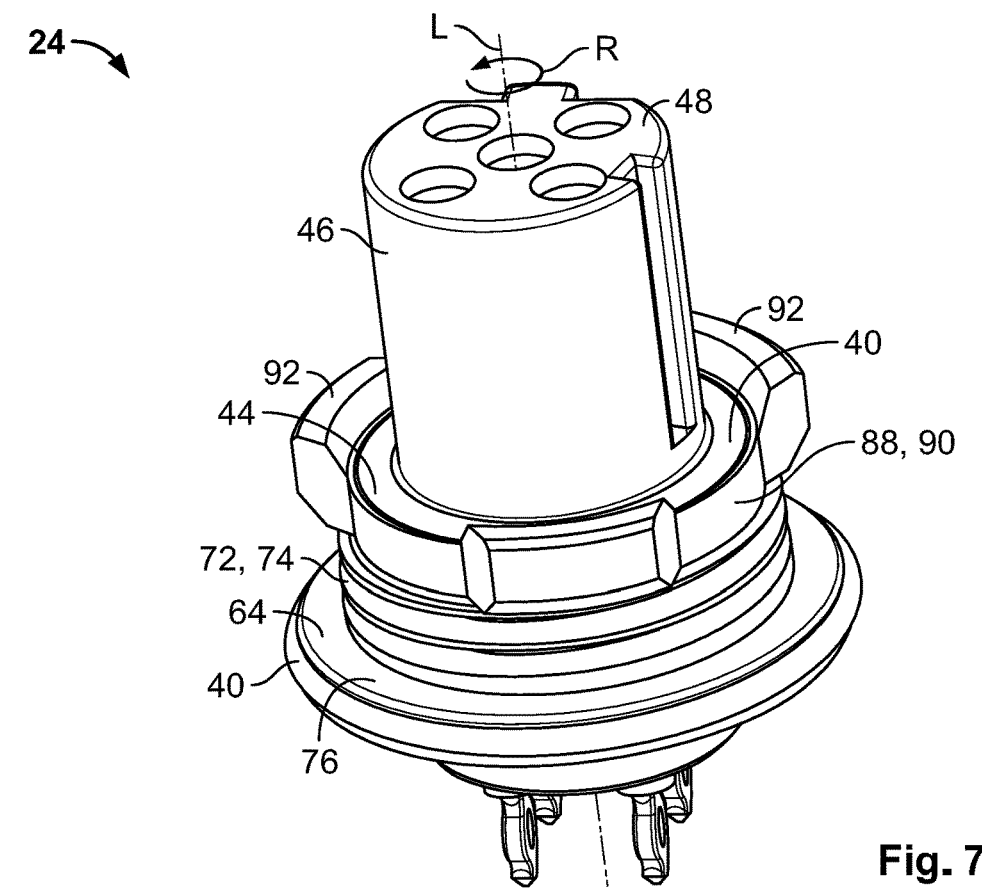
FIG. 7 is a schematic perspective view of a further exemplary embodiment of a socket insert.
Figure 8:
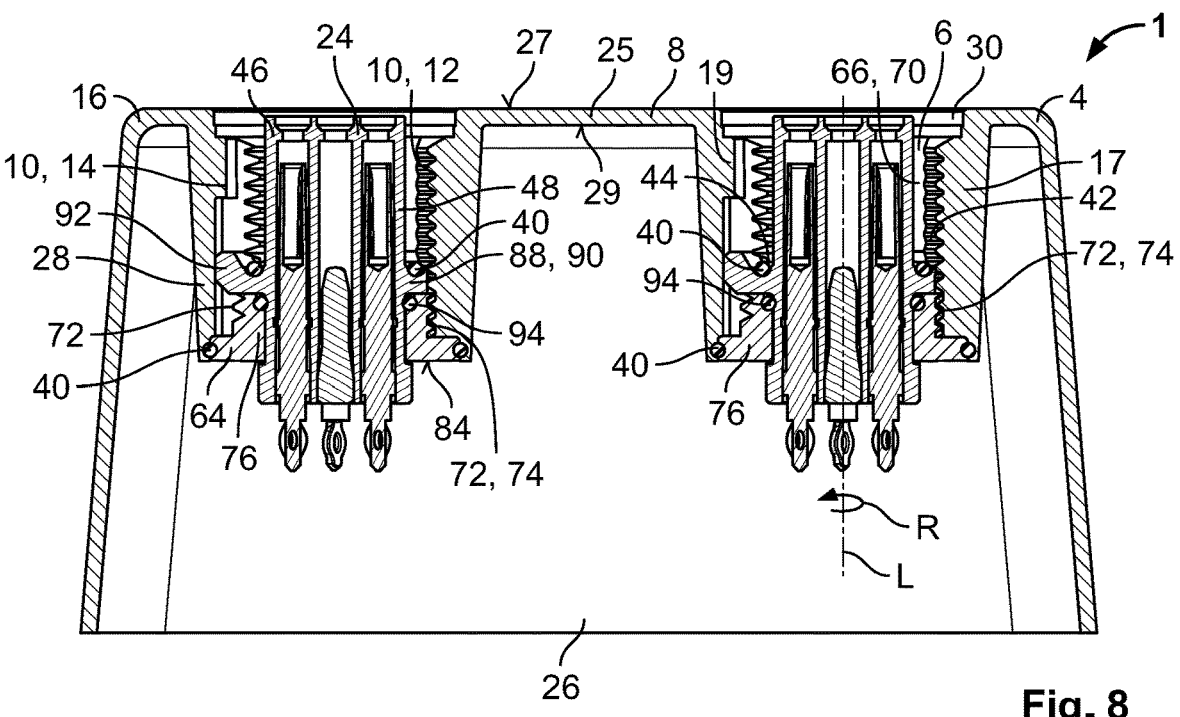
FIG. 8 is a schematic sectional view of a fourth embodiment of the distribution automation device with the socket insert of FIG. 7.

A further advantageous embodiment of the socket insert 24 is shown in FIGS. 7 and 8. In this embodiment, the entire securing flange 76 is received in the recess 80, so that the securing flange 76 does not have to be provided with the projection as in the previous embodiment. Of course, a tongue-groove joint may also be envisioned for the embodiment of FIGS. 7 and 8.

The socket insert 24 may comprise at least one keying stud 92 extending radially from the socket insert 24, particularly the contact pillar 48. The at least one keying stud 92 may protrude radially from the engagement shoulder 82 and may be adapted to be received in the notch 18. The at least one keying stud 92 may be arranged between the securing flange 76 and plug face of the socket insert 24, the plug face being adapted to mate with the plug connector and facing towards the socket. Therefore, the rotational position of the contact pillar 48 may be fixed before actuating the securing flange 76.

Complementary to the socket 6 as discussed with reference to FIGS. 1A, 1B, and 2, three keying studs 92 may be provided, the keying studs 92 being spaced apart from one another at around 120° and each being configured to be received in a respective notch 18. The at least one keying stud 92 and the securing flange 76 may be different parts, so that a rotational movement of the securing flange 76 is not transmitted to the at least one keying stud 92. Consequently, the socket insert 24 may be mounted in three different rotational positions in the socket 6.

A further sealing ring 94 may be provided between the securing flange 76 and the contact pillar 48, as can be seen in FIG. 8, therefore preventing any fluid ingress through a possible slot between securing flange 76 and contact pillar 48.

The keying stud 92 may extend radially beyond the securing feature 72, so that it may abut an inner wall 96 of the notch 18 further preventing any wobbling of the socket insert 24 within the socket 6. The protrusion 28, particularly the part of the protrusion 28 carrying the internal thread 42 may be elongated, so that the securing flange 76 may be screwed onto the thread 42 from one end opposing the socket 6 and the plug connector 34 may be screwed onto the thread 42 from the other end. The internal thread may even comprise a gap between both ends, in order to prevent the risk of inserting one of the securing flange 76 and plug connector 34 too deep into the socket 6.

A kit may be provided, the kit comprising a distribution automation device 1 having a socket 6 with at least two types of locking features 10 and at least two types of plug connectors 34. A first type of the plug connector 41 and a second type of the plug connector 52 have different types of complementary formed locking features. The first locking feature 12 and the complementary formed locking feature of the first type of the plug connector 41 employ a different system of positive fit than the second locking feature 14 and the complementary formed locking feature of the second type of the plug connector 52.

It is to be noted that even though the socket insert 24 is discussed in combination with the inventive distribution automation device 1, the socket insert 24 may be provided independent of the distribution automation device 1 and may be adapted to be integrated in existing distribution automation devices 1. In other words, the socket insert 24 discussed may also form an inventive concept on its own.

What is claimed is:

1. A distribution automation device for receiving a plurality of plug connectors, comprising:
   a housing having a plurality of sockets, each socket at least partially receives a respective plug connector of the plurality of plug connectors, each socket has a locking feature engaging a complementary locking feature of the respective plug connector, the locking feature of each socket and the housing are formed integrally with one another as a monolithic unit, a plurality of protrusions each extending from a front face of the housing extend into a volume at least partially enclosed by the housing, the locking feature of each socket is formed on one protrusion; and
   a plurality of socket inserts, each protrusion is received in one socket insert.

2. The distribution automation device of claim 1, wherein each socket insert is mounted in each socket.

3. The distribution automation device of claim 2, wherein a gap is formed between each socket insert and the housing, the locking feature of each socket is accessible through the gap.

4. The distribution automation device of claim 3, wherein the gap between each socket insert and the housing is open at a side of each socket facing an outside and forms a channel leading to the locking feature of each socket.

5. The distribution automation device of claim 2, further comprising a sealing ring sealing a connection between each socket insert and at least one of the housing and the respective plug connector.

6. The distribution automation device of claim 5, wherein the sealing ring and each socket insert are formed integrally with one another as a monolithic component.

7. The distribution automation device of claim 2, wherein the housing has a positioning rib on a bottom surface of the housing, the bottom surface facing away from an outside, the positioning rib positioning at least one socket insert of the plurality of socket inserts relative to one socket of the plurality of sockets.

8. The distribution automation device of claim 2, wherein each socket insert has a radially protruding keying stud.

9. The distribution automation device of claim 1, further comprising a plurality of socket inserts, the plurality of socket inserts are combined into a unitary part that is simultaneously unitarily mounted in the plurality of sockets.

10. The distribution automation device of claim 1, wherein the locking feature of each socket extends only over a part of an inner circumference of each socket.

11. The distribution automation device of claim 1, wherein the distribution automation device is a junction box or a sensor-actuator box.

12. The distribution automation device of claim 1, wherein each locking feature is one of a pair of locking features of each socket that are formed integrally with one another and the housing as the monolithic unit.

13. The distribution automation device of claim 12, wherein the pair of locking features of each socket include a first locking feature and a second locking feature that have different types of positive fit systems.

14. The distribution automation device of claim 13, wherein the pair of locking features of each socket extend over different parts of an inner circumference of each socket.

15. The distribution automation device of claim 13, wherein the second locking feature of each socket is radially further distanced to a center axis of each socket than the first locking feature of each socket.

16. The distribution automation device of claim 1, wherein the protrusion extends further into the volume than the locking feature.

17. A kit, comprising:
a first type of plug connector having a complementary formed locking feature;
a second type of plug connector having a different type of complementary formed locking feature than the first type of plug connector; and a distribution automation device including a housing and a socket insert, the housing has a socket at least partially receiving the first type of plug connector and the second type of plug connector, the socket having a pair of locking features that are formed integrally with one another and the housing as a monolithic unit, a first locking feature of the pair of locking features engages the complementary formed locking feature of the first type of plug connector with a first type of a positive fit system and a second locking feature of the pair of locking features engages the different type of complementary formed locking feature of the second type of plug connector with a second type of a positive fit system, the second type of the positive fit system is different than the first type of the positive fit system, a protrusion extending from a front face of the housing extends into a volume at least partially enclosed by the housing, the pair of locking features are formed on the protrusion, the socket insert has a sealing ring and a collar, the sealing ring extends around an outer circumference of the collar, the sealing ring is pressed between the collar and the protrusion.

18. A distribution automation device for receiving a plurality of plug connectors, comprising:
a housing having a plurality of sockets and a plurality of socket inserts, each socket at least partially receives a respective plug connector of the plurality of plug connectors, each socket has a locking feature engaging a complementary locking feature of the respective plug connector, the locking feature of each socket and the housing are formed integrally with one another as a monolithic unit, the plurality of socket inserts are combined into a monolithic part such that the plurality of socket inserts are simultaneously mounted in the plurality of sockets.

19. The distribution automation device of claim 18, wherein the monolithic part has a plurality of reduced thickness sections having a reduced material thickness as compared to a material thickness of sections adjacent to each reduced thickness section, each reduced thickness section abuts one socket insert, each reduced material section is a breaking area of the monolithic part for separating the one socket insert from the monolithic part.

20. The distribution automation device of claim 18, wherein the monolithic part is spaced apart from a printed circuit board.

* * * * *